US010621082B2

(12) United States Patent
Kawaguchi

(10) Patent No.: US 10,621,082 B2
(45) Date of Patent: Apr. 14, 2020

(54) INFORMATION PROCESSING DEVICE THAT GUARANTEES CONSISTENCY IN ACCESS SPACES

(71) Applicant: NEC Corporation, Minato-ku, Tokyo (JP)

(72) Inventor: Eiichiro Kawaguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/868,018

(22) Filed: Jan. 11, 2018

(65) Prior Publication Data

US 2018/0246808 A1 Aug. 30, 2018

(30) Foreign Application Priority Data

Feb. 27, 2017 (JP) .................................. 2017-034809

(51) Int. Cl.
*G06F 12/02* (2006.01)
*G06F 12/0837* (2016.01)
(Continued)

(52) U.S. Cl.
CPC ........ *G06F 12/0238* (2013.01); *G06F 9/3004* (2013.01); *G06F 9/30087* (2013.01);
(Continued)

(58) Field of Classification Search
CPC ............. G06F 12/0238; G06F 12/0284; G06F 12/0811; G06F 12/0837; G06F 2212/1032;
(Continued)

(56) References Cited

U.S. PATENT DOCUMENTS

2001/0042189 A1* 11/2001 Babaian ................ G06F 9/5066
712/23
2010/0042771 A1 2/2010 Kawaguchi
(Continued)

FOREIGN PATENT DOCUMENTS

JP H10-198644 7/1998
JP 2010-044599 A 2/2010

OTHER PUBLICATIONS

Japanese Office Action for JP Application No. 2017-034809 dated Oct. 24, 2017 with English Translation.

*Primary Examiner* — Ann J Lo
*Assistant Examiner* — Jane Wei

(57) ABSTRACT

An information processing apparatus includes a receiving unit that receives data from the outside, a first memory space to which data is written from the receiving unit, a second memory space to which a flag for synchronization is written, and an arithmetic unit. The arithmetic unit includes a synchronization control unit that instructs the receiving unit to synchronize the first memory space and the second memory space. The receiving unit includes a synchronization command issuing unit that issues a synchronization command to the first memory space and the second memory space, and a synchronization command receiving unit that receives a response indicating that data writing is guaranteed from the first memory space and a response indicating that flag writing is guaranteed from the second memory space, and responds to the arithmetic unit that synchronization is completed when writing to the first memory space and the second memory space is guaranteed.

7 Claims, 9 Drawing Sheets

(51) Int. Cl.
*G06F 12/0811* (2016.01)
*G06F 9/30* (2018.01)
*G06F 9/52* (2006.01)

(52) U.S. Cl.
CPC ............ *G06F 9/52* (2013.01); *G06F 12/0284* (2013.01); *G06F 12/0811* (2013.01); *G06F 12/0837* (2013.01); *G06F 2212/1024* (2013.01); *G06F 2212/1032* (2013.01)

(58) Field of Classification Search
CPC ........... G06F 2212/1024; G06F 9/3004; G06F 9/30087; G06F 9/52
See application file for complete search history.

(56) References Cited

U.S. PATENT DOCUMENTS

| | | | |
|---|---|---|---|
| 2010/0250865 A1* | 9/2010 | Rao | G11C 7/1075 711/149 |
| 2016/0357703 A1* | 12/2016 | Suzuki | G06F 12/0811 |
| 2018/0052788 A1* | 2/2018 | Guthrie | G06F 9/3834 |

* cited by examiner

Fig.1

| Time  | 0    | 1 | 2 | 3    | 4    | 5 | 6 | 7    | 8    | 9 | 10 | 11   | 12   | 13 | 14 | 15   | 16   |
|-------|------|---|---|------|------|---|---|------|------|---|----|------|------|----|----|------|------|
| MEM   | Data | x | x | x    | Data | x | x | x    | Data | x | x  | x    | Data | x  | x  | x    | x    |
| CR    | x    | x | x | Flag | x    | x | x | Flag | x    | x | x  | Flag | x    | x  | x  | Flag | x    |
| CORE0 |      |   |   |      | SYNC |   |   |      |      |   |    |      |      |    |    |      |      |
| CORE1 |      |   |   |      |      |   |   |      | SYNC |   |    |      |      |    |    |      |      |
| CORE2 |      |   |   |      |      |   |   |      |      |   |    |      | SYNC |    |    |      |      |
| CORE3 |      |   |   |      |      |   |   |      |      |   |    |      |      |    |    |      | SYNC |

Fig.2

| Time  | 0    | 1    | 2    | 3    | 4    | 5    | 6    | 7    | 8    | 9    | 10   |
|-------|------|------|------|------|------|------|------|------|------|------|------|
| MEM   | Data | Data | MFEN | Data | MFEN | Data | MFEN | x    | MFEN | x    | x    |
| CR    | Flag | Flag | x    | CFEN | Flag | CFEN | Flag | CFEN | x    | CFEN | x    |
| CORE0 |      | MFEN | CFEN |      | SYNC |      |      |      |      |      |      |
| CORE1 |      |      | MFEN | CFEN |      | MFEN | SYNC |      |      |      |      |
| CORE2 |      |      |      |      |      |      | CFEN | MFEN | SYNC |      |      |
| CORE3 |      |      |      |      |      |      |      |      | CFEN | CFEN | SYNC |

Fig.6

| Time  | 0    | 1    | 2    | 3    | 4    | 5    | 6    | 7    | 8    |
|-------|------|------|------|------|------|------|------|------|------|
| MEM   | Data | Data | FEN  | Data | FEN  | Data | FEN  | FEN  | X    |
| CR    | Flag | Flag | FEN  | Flag | FEN  | Flag | FEN  | FEN  | X    |
|       |      |      |      |      |      |      |      |      |      |
| CORE0 |      | FEN  |      | SYNC |      |      |      |      |      |
| CORE1 |      |      | FEN  |      |      | SYNC |      |      |      |
| CORE2 |      |      |      |      | FEN  |      |      | SYNC |      |
| CORE3 |      |      |      |      |      |      | FEN  |      | SYNC |

| PRECEDING DATA | FOLLOWING FLAG |
|---|---|
| MEMORY | MEMORY |
| MEMORY | COMMUNICATION REGISTER |
| COMMUNICATION REGISTER | MEMORY |
| COMMUNICATION REGISTER | COMMUNICATION REGISTER |

INFORMATION PROCESSING DEVICE THAT GUARANTEES CONSISTENCY IN ACCESS SPACES

INCORPORATION BY REFERENCE

The present invention is based upon and claims the benefit of priority from Japanese patent application No. 2017-034809, filed on Feb. 27, 2017, the disclosure of which is incorporated herein in its entirety by reference.

TECHNICAL FIELD

The present invention relates to an information processing apparatus, and in particular, to an information processing apparatus that guarantees consistency of a plurality of access spaces.

BACKGROUND ART

In a parallel computer system or a network device having a plurality of access spaces such as a memory space and a communication register space, a method of guaranteeing a plurality of access spaces has been considered. As a method of guaranteeing consistency in combination of a memory space and a communication register space, a method in which writing is performed after waiting for completion of preceding write at the time of synchronization has been known.

FIG. 1 illustrates an example of writing the data body to a memory region and writing a flag to a communication register. For example, a particular bit of an address accessing the communication register is defined as an identification flag for synchronization, and when the flag is asserted, completion of preceding write is waited for. In that case, after waiting for completion of preceding write issued to the memory region at time 0 (wait for a reply at NonPosted-Write), writing of a flag to the communication register is performed at time 3.

In the aforementioned method, as a flag is written at the end (global visibility of the flag comes last inevitably), when the flag is able to be seen on the processor core side, completion of preceding write is guaranteed. Accordingly, it is easy as a method of guaranteeing consistency. Meanwhile, even in the case where a flag is written to a memory, it is possible to perform synchronization by asserting a particular address bit, or it is also possible to have a flag for synchronization in an address translation mechanism such as TLB (Translation Lookaside Buffer).

Further, as another method of guaranteeing consistency in combination of a memory space and a communication register space, a method of performing synchronization from the receiving side has been known. For example, FIG. 2 illustrates the case where the data body is written to the memory region and a flag is written to the communication register. In FIG. 2, a synchronization command is issued to each of different spaces. This means that for the synchronization of a memory space, a FENCE command (MFEN) for the memory is issued.

Meanwhile, for the synchronization of a communication register space, a FENCE command (CFEN) for the communication register is issued. In this case, two synchronization commands must be issued.

Patent Literature 1: JP 2010-44599 A

However, the aforementioned method in which writing is performed after waiting for completion of preceding write at the time of synchronization has a problem in that, although easy to implement, while waiting for as completion of the preceding write, there is a free space in the internal bus that is inefficient.

Further, the method of performing synchronization from the receiving side has another problem that as synchronization is performed for each space, visibility from a user is poor, and it takes labor.

As related art, Patent Literature 1 discloses a technology of guaranteeing global visibility of data to be stored in a memory. However, it is not a method of efficiently guaranteeing a plurality of access spaces.

SUMMARY

In light of the foregoing, an exemplary object of the present invention is to solve a problem that a plurality of access spaces cannot be guaranteed efficiently.

An information processing apparatus that is an exemplary aspect of the present invention includes a receiving unit configured to receive data from the outside, a first memory space to which data is written from the receiving unit, a second memory space to which a flag, to be used for synchronizing writing of the data, is written, and an arithmetic unit configured to perform processing on the data. The arithmetic unit includes a synchronization control unit configured to instruct the receiving unit to synchronize the first memory space and the second memory space, and receive a response indicating completion of synchronization from the receiving unit. The receiving unit includes a synchronization command issuing unit configured to issue a synchronization command to each of the first memory space and the second memory space, in accordance with a synchronization instruction from the arithmetic unit; and a synchronization command receiving unit configured to, in accordance with the synchronization command, receive a response indicating that writing of the data is guaranteed from the first memory space and receive a response indicating that writing of the flag is guaranteed from the second memory space, determine that writing to the first memory space and to the second memory space is guaranteed, and respond to the arithmetic unit that synchronization is completed when writing to the first memory space and to the second memory space is guaranteed.

Further, a processor that is another exemplary aspect of the present invention includes a receiving unit configured to receive data from the outside, a first memory space to which data is written from the receiving unit, a second memory space to which a flag, to be used for synchronizing writing of the data, is written, and an arithmetic unit configured to perform processing on the data. The arithmetic unit includes a synchronization control unit configured to instruct the receiving unit to synchronize the first memory space and the second memory space, and receive a response indicating completion of synchronization from the receiving unit. The receiving unit includes a synchronization command issuing unit configured to issue a synchronization command to each of the first memory space and the second memory space, in accordance with a synchronization instruction from the arithmetic unit, and a synchronization command receiving unit configured to, in accordance with the synchronization command, receive a response indicating that writing of the data is guaranteed from the first memory space and receive a response indicating that writing of the flag is guaranteed from the second memory space, determine that writing to the first memory space and to the second memory space is guaranteed, and respond to the arithmetic unit that synchronization is completed when writing to the first memory space and to the second memory space is guaranteed.

Further, a synchronization method that is another exemplary aspect of the present invention is a synchronization method performed by an information processing apparatus including a receiving unit configured to receive data from the outside, a first memory space to which data is written from the receiving unit, a second memory space to which a flag, to be used for synchronizing writing of the data, is written, and an arithmetic unit configured to perform processing on the data. The method includes, by the arithmetic unit, instructing the receiving unit to synchronize the first memory space and the second memory space, and receive a response indicating completion of synchronization from the receiving unit, and by the receiving unit, in accordance with a synchronization instruction from the arithmetic unit, issuing a synchronization command to each of the first memory space and the second memory space, and receiving a response indicating that writing of the data is guaranteed from the first memory space and a response indicating that writing of the flag is guaranteed from the second memory space, determining that writing to the first memory space and to the second memory space is guaranteed, and responding to the arithmetic unit that synchronization is completed when writing to the first memory space and to the second memory space is guaranteed.

With the configuration described above, the present invention is able to efficiently guarantee a plurality of access spaces.

BRIEF DESCRIPTION OF THE DRAWINGS

FIG. 1 illustrates an exemplary method of guaranteeing a plurality access spaces related to the present invention;

FIG. 2 illustrates an exemplary method of guaranteeing a plurality access spaces related to the present invention;

FIG. 6 illustrates an exemplary operation of a method of guaranteeing a plurality of access spaces by the information processing apparatus disclosed in FIG. 3;

EXEMPLARY EMBODIMENTS

First Exemplary Embodiment

Figure 3:
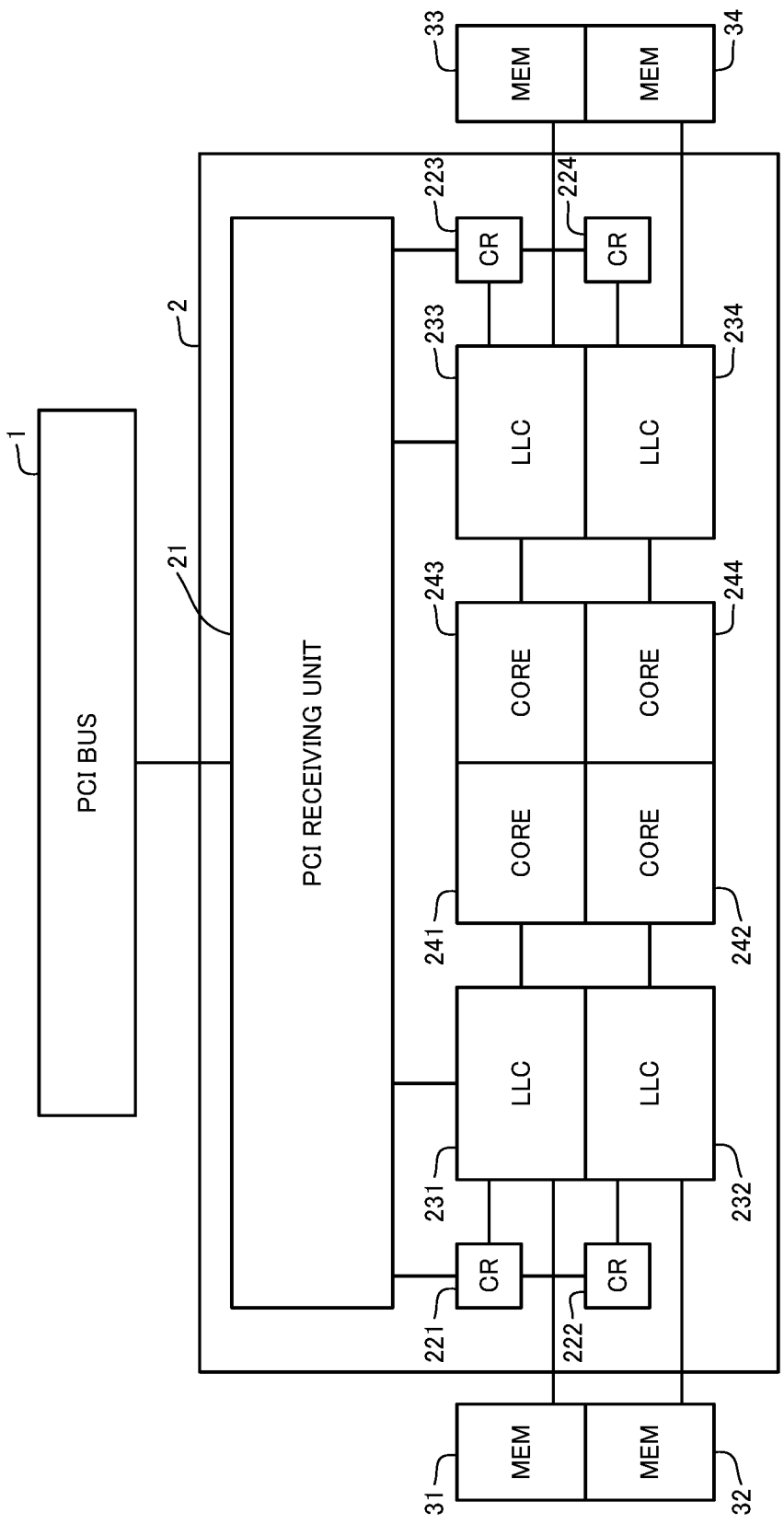
FIG. 3 is a block diagram illustrating a configuration of an information processing apparatus according to a first exemplary embodiment of the present invention.
Figure 4:
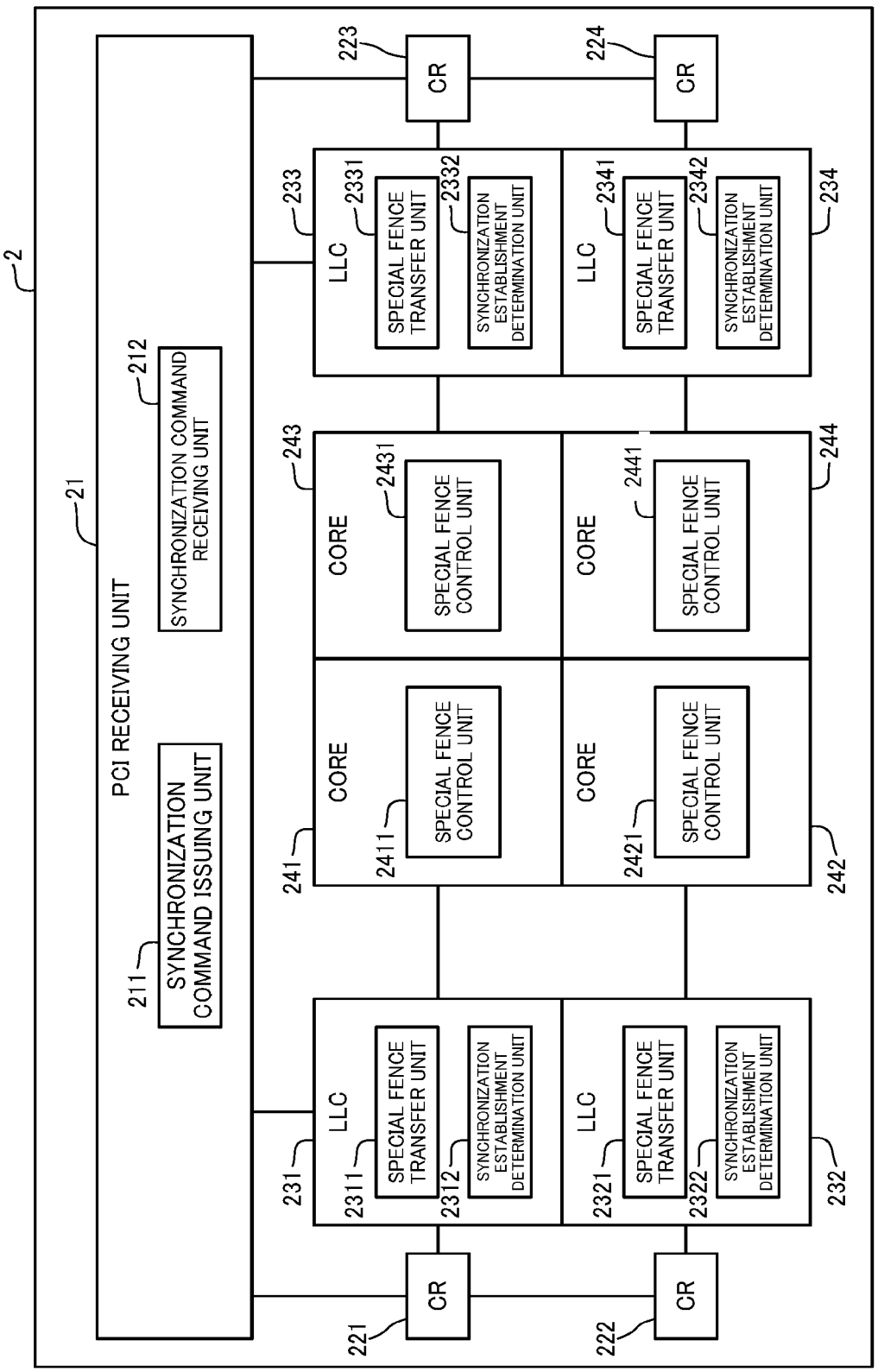
FIG. 4 is a diagram illustrating a configuration of the processor disclosed in FIG. 3.

A first exemplary embodiment of the present invention will be described with reference to FIGS. 3 to 10. FIGS. 3 and 4 are diagrams for explaining a configuration of an information processing apparatus. FIGS. 5 to 10 illustrate the operation of the information processing apparatus.

FIG. 3 illustrates the overall configuration of an information processing apparatus of the present embodiment. The information processing apparatus includes a PCI (Peripheral Component Interconnect) bus 1, a processor 2 mounted on a PCI card connected to the PCI bus 1, and memories (MEM) 31-34 mounted on the PCI card and connected to the processor 2. The PCI bus 1 is a standard PCI Express, and the memories are also standard memories.

The processor 2 includes a PCI receiving unit 21, communication registers (CR) 221-224, last level caches (LLC) 231-234, and processor cores (CORE) 241-244. IN this example, a four-core configuration consisting of four processor cores, a four-last level cache configuration that are interleaved, and a four-communication register configuration that are also interleaved, are described as an example. However, the present invention is not limited to the aforementioned configuration. For example, the number of the processor cores, the number of the last level caches, and the number of the communication registers may be one, or other than four.

In the present embodiment, the PCI receiving unit 21 that receives data from the outside writes data to the memories (MEM) 31-34 via the memory space (first memory space) consisting of the last level caches (LLC) 231-234, that is, the last level caches (LLC) 231-234, and writes a flag for synchronizing data writing, to the communication register space (second memory space) consisting of the communication registers (CR) 221-224, as described below.

Figures 10, 11:
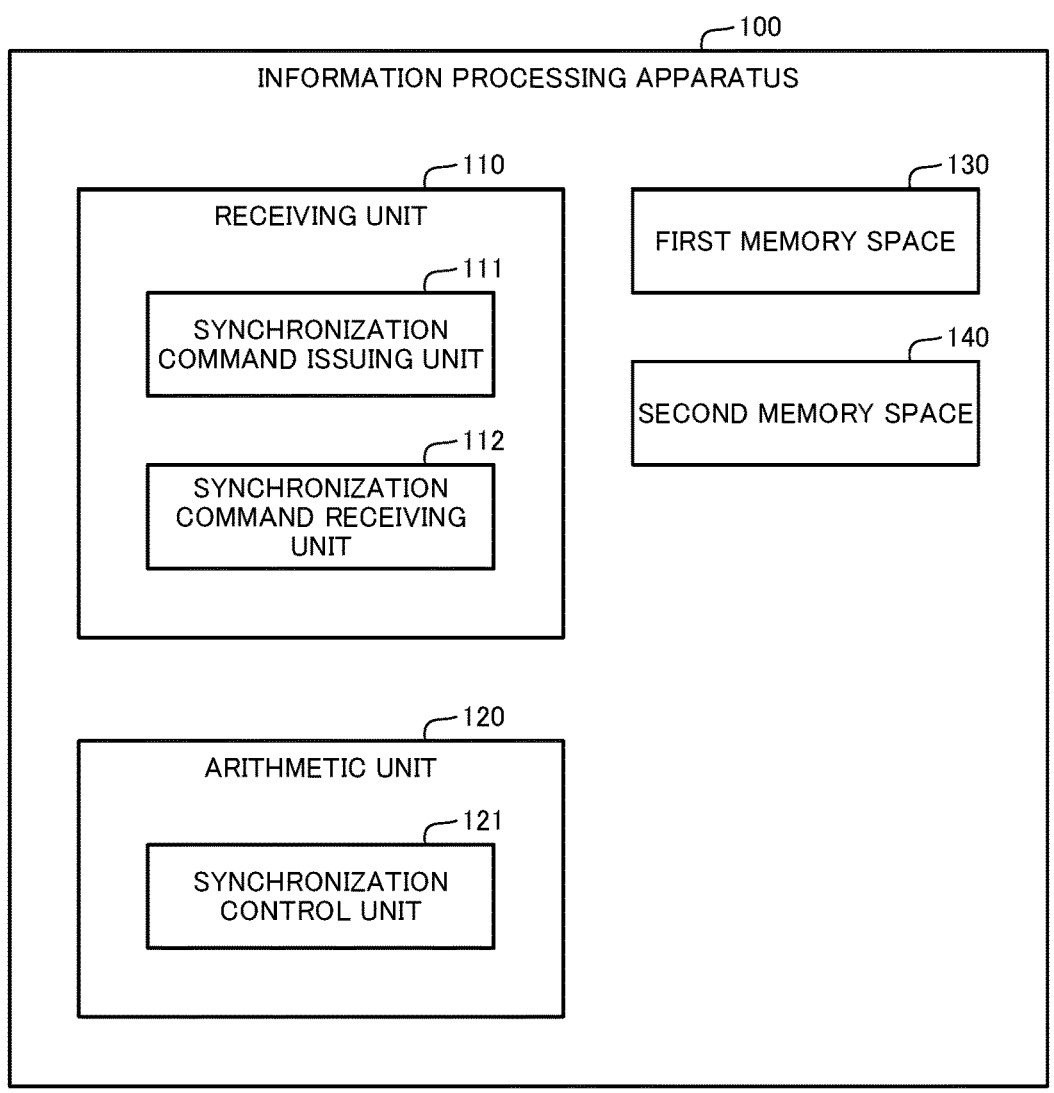
FIG. 10 illustrates a memory space of an information processing apparatus according to the present invention.
FIG. 11 is a block diagram illustrating a configuration of an information processing apparatus according to a second exemplary embodiment of the present invention.

However, in the present invention, as illustrated in FIG. 10, data may be written to the communication registers (CR) 221-224 (first memory space), and a flag may be written to the last level caches 231-234 (second memory space). Further, data and a flag may be written to the last level caches 231-234 (first memory space and the second memory space), or data and a flag may be written to the communication registers (CR) 221-224 (first memory space and the second memory space).

FIG. 4 illustrates the details of the configuration inside the processor 2 disclosed in FIG. 3, which will be described below in detail. The processor cores (CORE) 241-244 are general central processing units (arithmetic unit). In the present embodiment, the processor 2 incorporates four cores therein, and performs processing on data written to the memories as described below.

The processor cores (CORE) 241-244 include special FENCE control units (synchronization control units) therein, respectively. The Special FENCE control units 2411-2441 each have a function of issuing a special FENCE command prompting an operation of the present invention. Specifically, the special FENCE control units 2411-2441 in the processor cores 241-244 each look in a flag written to the communication registers (CR) 221-224, and with use of a change in the flag as a trigger, issue, to the PCI receiving unit 21, a special FENCE command instructing synchronization of the both spaces, as described below. Further, the special FENCE control units 2411-2441 each have a function of receiving a response of synchronization completion from the PCI receiving unit 21, as a reply to the special FENCE command. When issuing a special FENCE command, the special FENCE control units 2411-2441 refrain from executing the subsequent command until they receive a reply. Alternatively, it is also acceptable to additionally set a general FENCE command to stop the command.

The last level caches (LLC) 231-234 each have a so-called general cache mechanism, and are configured to write data to the memories (MEM) 31-34 via the last level caches (LLC) 231-234. The last level caches (LLC) 231-234 have communication channels. In the example of FIG. 4, the last level caches 231-234 have two paths, specifically, a path of the last level caches 231 and 232 and a path of the last level caches 233 and 234, when viewed from the PCI receiving unit 21. From each of the processor cores (CORE) 241-244, it is possible to access any of the last level caches (LLC) 231-234 via the communication paths between the processor cores. Further, the last level caches (LLC) 231-234 also have paths with the communication registers (CR) 221-224, by which an access from the processor cores (CORE) 241-244 to the communication registers (CR) 221-224 can be realized.

The last level caches (LLC) 231-234 have special FENCE transfer units 2311-2341, and transfer a special FENCE command, issued by the processor cores (CORE) 241-244, to the PCI receiving unit 21. The special FENCE transfer units 2311-2341 each also have a function of transferring a reply to the special FENCE command in which the processing is completed, to the processor core (CORE) 241-244 that issued the special FENCE command.

Further, the last level caches (LLC) 231-234 have synchronization establishment determination units 2312-2342. The synchronization establishment determination units 2312-2342 each have a function of, when receiving a synchronization command issued by the PCI receiving unit 21, returning a synchronization command reply at the time of writing the write data, held by each of the last level caches (LLC) 231-234, to the memories (MEM) 31-34, that is, at the time when the global visibility is established, as described below. When the global visibility is established, visibility of a preceding write command is guaranteed, when viewed from the processor core. This means that the last level caches (LLC) 231-234 each transmit a response representing that writing of write data is guaranteed, to the PCI receiving unit 21.

The communication registers (CR) 221-224 are a group of registers for communication, capable of performing accessing faster than the last level caches 231-234, that is, the memories (MEM) 31-34. They are able to read and write data, similar to the memories. As they are registers, it is possible to perform accessing faster than the memories (MEM) 31-34. However, as they are spaces different from the memories (MEM) 31-34, in order to realize communication control by using both the memories (MEM) 31-34 and the communication registers (CR) 221-224, consistency control for both spaces is required, which is easily realized in the present invention. It should be noted that the communication registers (CR) 221-224 also have communication channels with the PCI receiving unit 21. In the example of FIG. 4, there are a path of the communication registers (CR) 221 and 222 and a path of the communication registers (CR) 223 and 224, when viewed from the PCI receiving unit 21.

The PCI receiving unit 21 receives a request (read or write) from the outside of the PCI device. In the present embodiment, the PCI receiving unit 21 includes a synchronization command issuing unit 211 and a synchronization command receiving unit 212, in addition to the functions of a typical receiving unit.

The synchronization command issuing unit 211 confirms completion of a preceding command with respect to both the memory space and the communication space, triggered by a special FENCE command issued by any of the processor cores 241-244. For this confirmation, the synchronization command issuing unit 211 issues a synchronization command to each of the two paths of the memory space (last level caches (LLC) 231-234. To the communication register space (communication registers (CR) 221-224), a read command is issued as a synchronization command to either one of the paths. In this way, the synchronization command issuing unit 211 issues synchronization commands of different contents corresponding to the difference between the configurations of the memory space and the communication register space.

Further, when confirming completion of synchronization in each of the memory space and the communication register space, the synchronization command receiving unit 212 returns a special FENCE command reply to the processor core that issued the special FENCE command. Establishment of the synchronization is determined as described below.

First, with respect to the memory space, synchronization commands are issued to the two spaces, and a synchronization command reply is returned from each of the last level caches (LLC) 231-234. In the example of FIG. 4, as there are four last level caches (LLC), synchronization command replies are returned from the memory space. When they are established, it is determined that global visibility is secured, including all write commands held by the last level caches (LLC). Accordingly, it is determined that sequence guaranty with respect to the memory space is established.

On the other hand, with respect to the communication register space, a dummy read command is simply issued as a synchronization command. In the communication register (CR), a write command is not held as in the last level cache (LLC). Accordingly, when the following dummy read command is replied, it is determined that completion of the preceding write command is guaranteed. At that time, the sequence guaranty with respect to the communication register space is established. However, it is based on the premise that it is guaranteed that returning a reply to the dummy read takes a longer time than the write timing to all of the communication registers. This means that although the write timing differs depending on the mounting positions of the communication registers, writing is one way but reading is a round way. Accordingly, when completion of preceding write and completion of read reply are compared, completion of read reply is often delayed, generally. Such a structural characteristic is utilized.

Then, the synchronization command receiving unit 212 determines completion of synchronization in combination of the replies from the two different spaces. Specifically, regarding the memory space, the number of synchronization command replies is counted, and upon receipt of replies from all of the last level caches (LLC), writing is guaranteed, so that establishment of synchronization is determined. Regarding the communication register space, a dummy read replay is monitored, and upon receipt of a reply, writing is guaranteed, so that establishment of synchronization is determined. Then, when synchronization between both spaces is established, the synchronization command receiving unit 212 determines that synchronization is completed, and transmits a reply to the special FENCE command to the processor core (CORE) 241-244 via the last level cache (LLC) 231-234.

[Operation]

Figure 5:
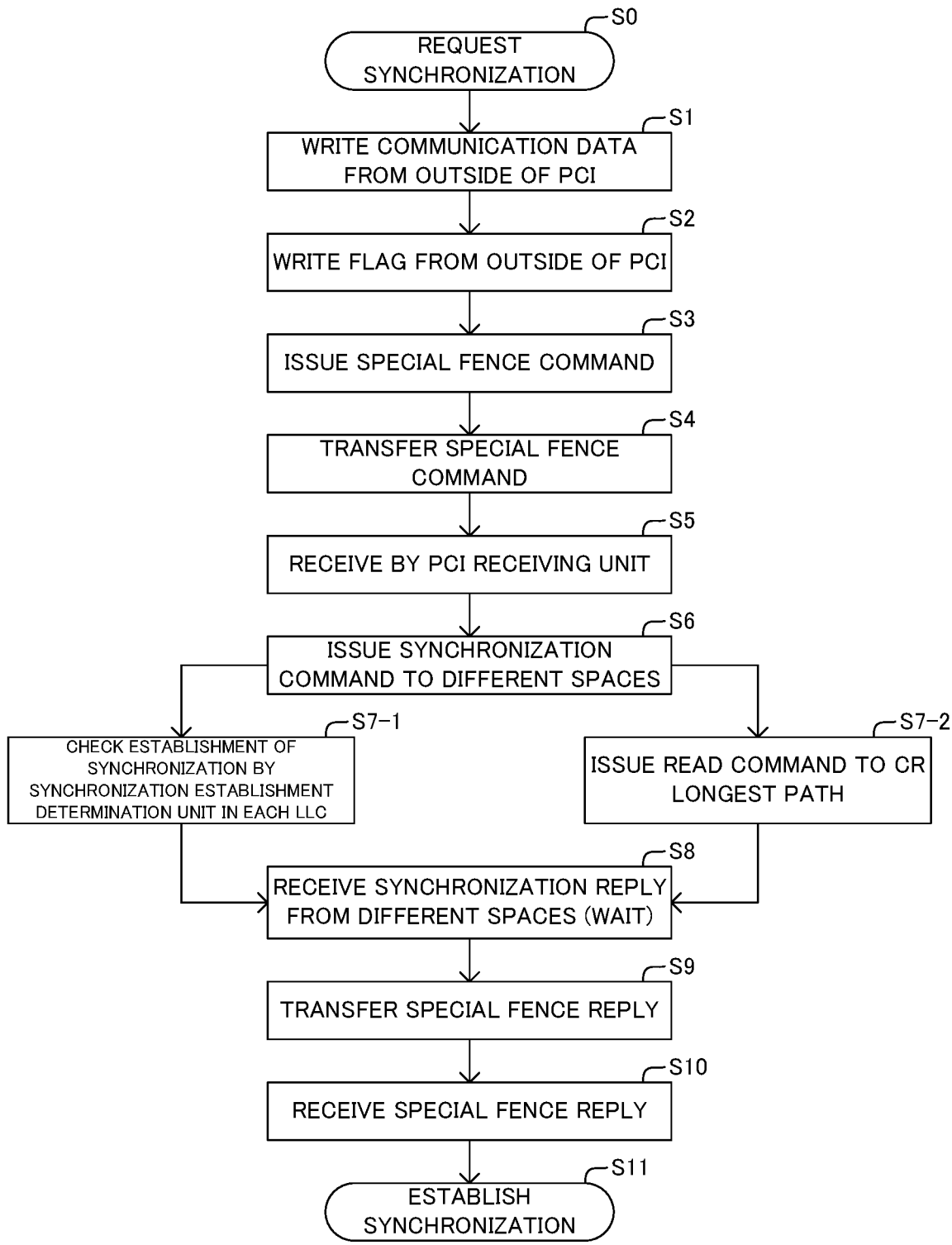
FIG. 5 is a flowchart illustrating operation of the information processing apparatus disclosed in FIG. 3.
Figure 7:
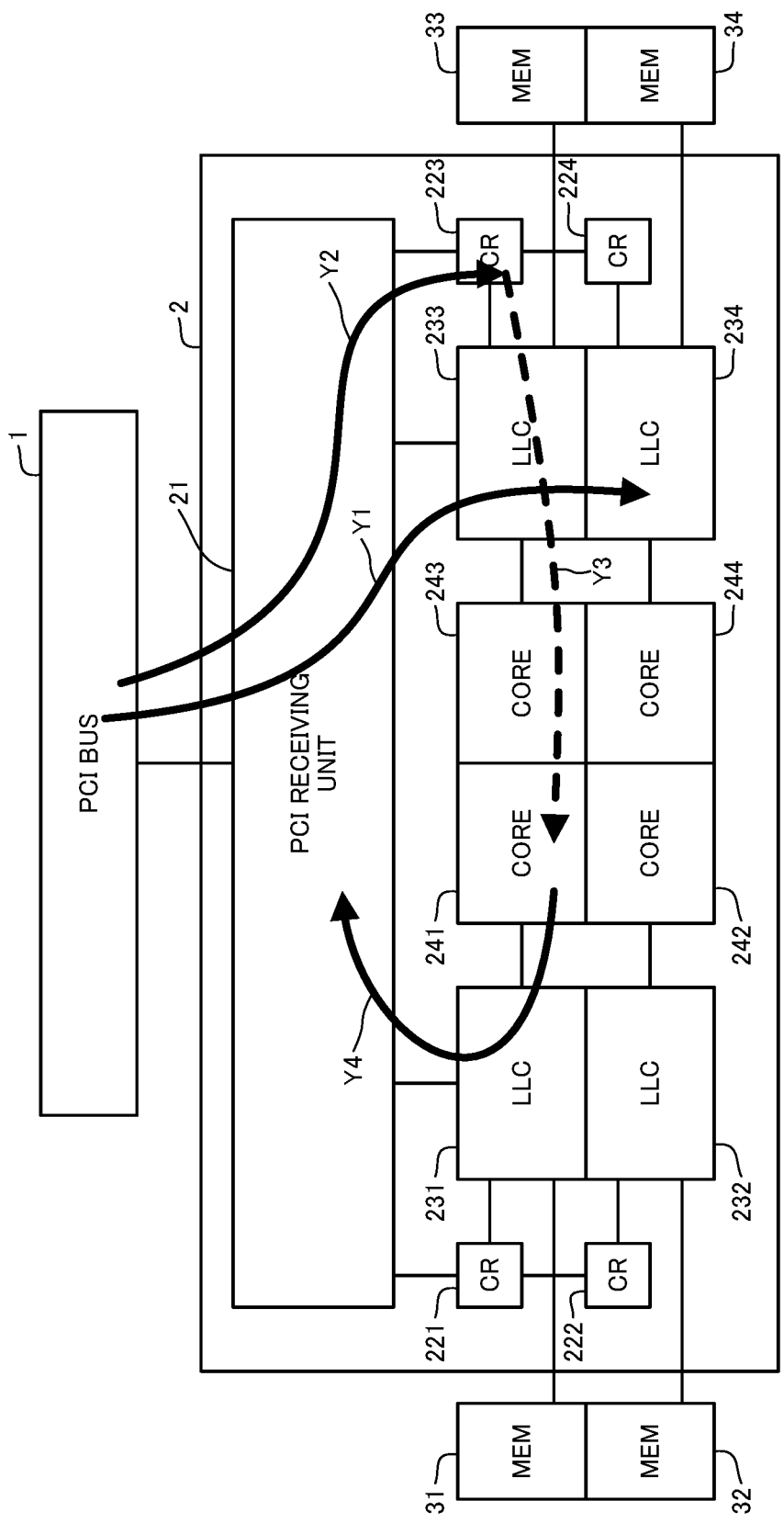
FIG. 7 illustrates an exemplary operation of a method of guaranteeing a plurality of access spaces by the information processing apparatus disclosed in FIG. 3.
Figure 8:
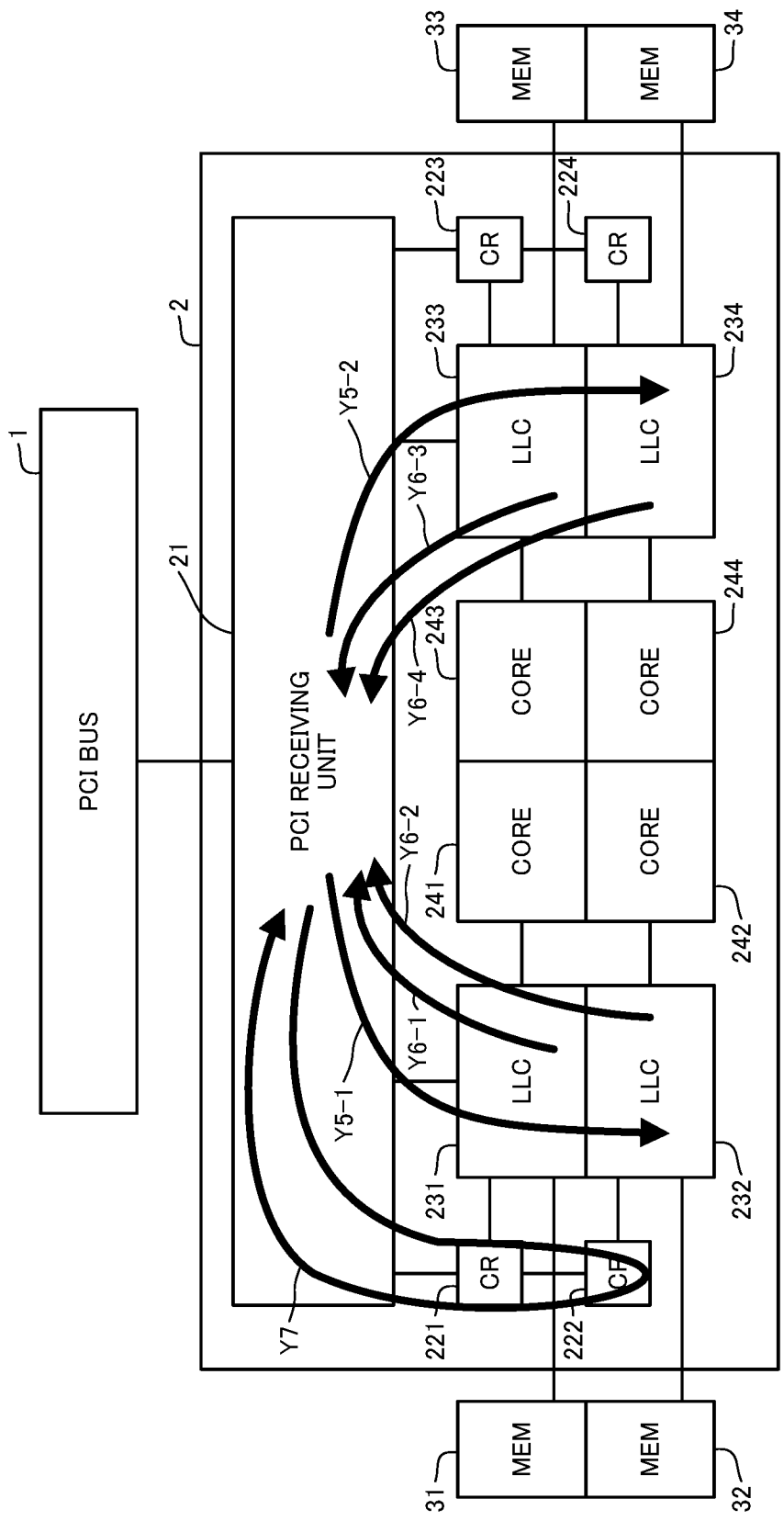
FIG. 8 illustrates an exemplary operation of a method of guaranteeing a plurality of access spaces by the information processing apparatus disclosed in FIG. 3.
Figure 9:
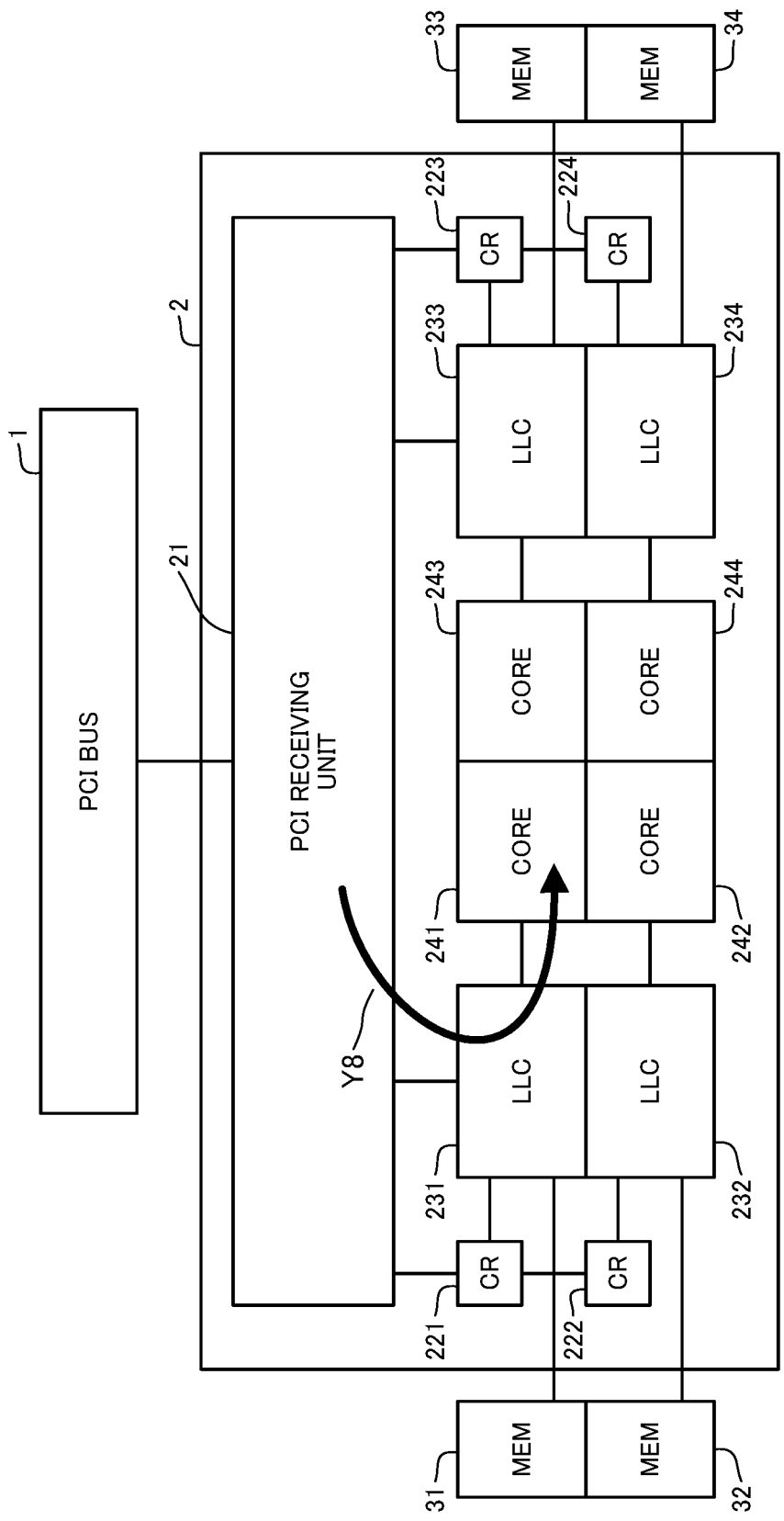
FIG. 9 illustrates an exemplary operation of a method of guaranteeing a plurality of access spaces by the information processing apparatus disclosed in FIG. 3.

Next, processing operation of the information processing apparatus having the aforementioned configuration will be described with reference to FIGS. 5 to 10. FIG. 5 is a flowchart showing the processing operation, and FIG. 6 illustrates states of the respective units. FIGS. 7 to 9 illustrate flows of information in the processor. FIG. 10 illustrates an example of storing data and a flag.

(Step S0: Synchronization Request)

The case where data is transferred from the outside of the PCI and synchronization is established will be described as an example. As described above with reference to FIG. 10, any combinations of write destinations of data body and a flag are possible. In this example, the case where data body is written to the memory space and a flag for synchronization is written to the communication register space will be considered for description.

(Step S1: Write Communication Data from Outside of PCI)

A data body is written from the outside of the PCI (Time 0 of FIG. 6, an arrow Y1 of FIG. 7). Here, it is assumed that the data body is written to the memory space. Accordingly, a write command is issued from the PCI receiving unit 21 to the last level caches (LLC) 231-234. At this point, write data is in the last level caches (LLC) 231-234, writing is not fixed, and global visibility is not guaranteed.

(Step S2: Write Flag from Outside of PCI)

A flag is written from the outside of the PCI (Time 0 of FIG. 6, arrow Y2 of FIG. 7). Here, it is assumed that the flag is written to the communication register space. Accordingly, a write command is issued from the PCI receiving unit 21 to the direction of the communication registers (CR). The writing path depends of the address. The processor cores (CORE) 241-244 look in the address and monitor a change in the flag.

(Step S3: Issue Special FENCE Command)

The processor cores (CORE) 241-244 look in the address to which the flag is written (Time 1 of FIG. 6, arrows Y3 and Y4 of FIG. 7). In this example, the communication register is looked in. When the flag is changed in the looked in region, it is determined that writing of the flag from the outside of the PCI is completed. At this time, however, it is not determined that writing is completed inside the processor 2. Therefore, a special FENCE command is issued for synchronization inside the processor. It is only necessary that the special FENCE command reaches the PCI receiving unit 21 through any path. Accordingly, it is transmitted to the last level caches (LLC) 231-234 through the shortest path.

(Step S4: Transfer Special FENCE Command)

When the last level caches (LLC) 231-234 receive the special FENCE command, they transfer the command in the direction of the PCI receiving unit 21 by the special FENCE transfer units 2311-2341 (arrow Y4 of FIG. 7). In the case where a plurality of last level caches (LLC) 231-234 are passed through, transfer is repeated.

(Step S5: Receive by PCI Receiving Unit)

When the PCI receiving unit 21 receives the special FENCE command, the PCI receiving unit 21 instructs the synchronization command issuing unit 211 to synchronize the spaces.

(Step S6: Issue Synchronization Command to Different Space)

Upon receipt of the instruction for synchronization, the synchronization command issuing unit 211 makes a synchronization request to both the memory space and the communication register space (Time 2 of FIG. 6). With respect to the memory space, a synchronization command is issued to each of the two paths (arrows Y5-1 and Y5-2 of FIG. 8). This means that a synchronization command is issued to all of the last level caches that are four interleaved spaces. On the contrary, with respect to the communication register space, a dummy read command is issued to either one of the paths (arrow Y7 of FIG. 8). This means that with respect to the communication register space, it is only necessary to issue a read command that is a synchronization command to any one of the communication registers.

(Step S7-1: Check Synchronization Establishment by Synchronization Establishment Determination Unit in Each LLC)

Each of the last level caches (LLC) 231-234 that received the synchronization command returns a synchronization command reply at the time when the global visibility held by each of the last level caches (LLC) 231-234 is fixed in the synchronization establishment determination units 2312-2342 (Time 2 of FIG. 6, arrows Y6-1, Y6-2, Y6-3, and Y6-4 of FIG. 8) This means that as a reply is returned from each of the last level caches (LLC) 231-234, the number of the synchronization command replies is the same as the number of the last level caches (LLC) 231-234. In the present embodiment, four replies are made.

(Step S7-2: Issue Read Command to CR Longest Path)

With respect to the communication register space, the issued dummy read request makes a normal access, and a reply is returned to the PCI receiving unit 21 (Time 2 of FIG. 6, arrow Y7 of FIG. 8). At the time when the reply is received, completion of the preceding write command to the communication register space is guaranteed. This means that in the communication register space, writing of the flag is guaranteed when a reply is received.

(Step S8: Receive Synchronization Reply from Different Spaces (Waiting))

The synchronization command receiving unit 212 of the PCI receiving unit 21 waits until all synchronization replies to the synchronization command issued to the memory space and a reply to the dummy read command issued to the communication register space are returned. Specifically, the synchronization command receiving unit 212 waits for four synchronization replies and one reply to the dummy read command. When the four synchronization replies and one reply to the dummy read command are received, it is determined that synchronization is completed. Therefore, the synchronization command receiving unit 212 returns a special FENCE command reply to the requester processor core (Time 3 of FIG. 6, arrow Y8 of FIG. 9).

(Step S9: Transfer Special FENCE Reply)

Upon receipt of the special FENCE command reply, the last level cache (LLC) 231-234 transfers the command to the requester processor core (CORE) 241-244, by the special FENCE transfer unit 2311-2341. In the case where a plurality of last level caches (LLC) 231-234 are passed, the transfer is repeated (Time 3 of FIG. 6, arrow Y8 of FIG. 9).

(Step S10: Receive Special FENCE Reply)

When the processor core (CORE) 241-244 receives the special FENCE reply, it is determined that the sequence guarantee of the memory access or the communication register access from the PCI direction before issuance of the special FENCE command is established (Time 3 of FIG. 6, arrow Y8 of FIG. 9).

(Step S11: Establishment of Synchronization)

Establishment of synchronization means establishment of release consistency. Accordingly, in the subsequent data accessing, global visibility is guaranteed. Therefore, an access to correct data can be made (Time 3 of FIG. 6, arrow Y8 of FIG. 9).

As described above, according to the present invention, when there are two types of spaces through which accessing is made from the PCI space to the PCI device, the global visibilities of the two types can be guaranteed by one FENCE command. Thereby, it is possible to realize a release consistence system in which software control is easy and performance is not deteriorated.

It should be noted that the respective units provided to the PCI receiving unit 21, the processor cores 241-244, and the last level caches 231-234 may be constructed by installing programs to the arithmetic units therein, or may be configured of electronic circuits.

Second Exemplary Embodiment

Next, a second exemplary embodiment of the present invention will be described with reference to FIG. 11. FIG. 11 is a block diagram illustrating a configuration of an information processing apparatus of a second exemplary embodiment. The information processing apparatus of the present embodiment shows the outline of the information processing apparatus described in the first exemplary embodiment.

As illustrated in FIG. 11, an information processing apparatus 100 of the present embodiment includes a receiving unit 110 that receives data from the outside, a first memory space 130 to which data is written from the receiving unit 110, a second memory space 140 to which a flag for synchronizing writing of the data is written, and an arithmetic unit 120. The arithmetic unit 120 includes a synchronization control unit 121 that instructs the receiving unit 110 to synchronize the first memory space 130 and the second memory space 140, and receives a response of completion of synchronization from the receiving unit.

The receiving unit 110 also includes a synchronization command issuing unit 111 that issues a synchronization command to each of the first memory space 130 and the second memory space 140 according to a synchronization instruction from the arithmetic unit 120, and a synchronization command receiving unit 112 that receives a response indicating that data writing from the first memory space 130 is guaranteed and a response representing that flag writing from the second memory space 140 is guaranteed according to the synchronization command, determines that writing to each of the first memory space 130 and the second memory space 140 is guaranteed, and when writing to the first memory space 130 and the second memory space 140 is guaranteed, replies to the arithmetic unit 120 that synchronization is completed.

The information processing apparatus 100 configured as described above operates as described below. First, when data and a flag are written from the outside, the timing of global visibility differs depending on the written location. For example, data is written to the first memory space 130, and the flag is written to the second memory space 140. Then, when the arithmetic unit 120 instructs synchronization, the receiving unit 110 issues a synchronization command to each of the memory spaces 130 and 140. For example, with respect to the interleaved first memory space 130, a synchronization command is issued to every interleaved space, and receives a synchronization reply from every interleaved space. Meanwhile, with respect to the second memory space 140, the receiving unit 110 simply issues a read request and receives a reply.

Then, the receiving unit 110 receives a reply representing that data writing is guaranteed from the first memory space 130, and receives a reply representing that flag writing is guaranteed from the second memory space 140. Thereby, the receiving unit 110 confirms establishment of synchronization in the memory spaces 130 and 140. As such, synchronization is established in both the different spaces. Thereby, synchronization is completed in both the different spaces.

Then, the receiving unit 110 returns a reply to the synchronization command, to the arithmetic unit 120. Upon receipt of the reply, as global visibility of the preceding command is guaranteed, the arithmetic unit 120 is able to access the data area.

As described above, according to the present invention, when there are two types of spaces that are accessed from the outside, the two types of global visibility can be guaranteed by one synchronization command. Thereby, it is possible to realize a release consistency system in which software control is easy and the performance is not deteriorated.

The whole or part of the exemplary embodiments disclosed above can be described as, but not limited to, the following supplementary notes. Hereinafter, the outline of the configurations of an information processing apparatus, a processor, and a synchronization method according to the present invention will be described. However, the present invention is not limited to the configurations described below.

(Supplementary Note 1)

An information processing apparatus comprising:
 a receiving unit configured to receive data from outside;
 a first memory space to which data is written from the receiving unit;
 a second memory space to which a flag is written, the flag being used for synchronizing writing of the data; and
 an arithmetic unit configured to perform processing on the data, wherein
 the arithmetic unit includes a synchronization control unit configured to instruct the receiving unit to synchronize the first memory space and the second memory space, and receive a response indicating completion of synchronization from the receiving unit, and
 the receiving unit includes:
  a synchronization command issuing unit configured to issue a synchronization command to each of the first memory space and the second memory space, in accordance with a synchronization instruction from the arithmetic unit; and
  a synchronization command receiving unit configured to, in accordance with the synchronization command, receive a response indicating that writing of the data is guaranteed from the first memory space and receive a response indicating that writing of the flag is guaranteed from the second memory space, determine that writing to the first memory space and to the second memory space is guaranteed, and respond to the arithmetic unit that synchronization is completed when writing to the first memory space and to the second memory space is guaranteed.

(Supplementary Note 2)

The information processing apparatus according to supplementary note 1, wherein the synchronization command issuing unit of the receiving unit issues, to the first memory space and the second memory space, the synchronization commands having contents corresponding to configurations of the first memory space and the second memory space, respectively.

(Supplementary Note 3)

The information processing apparatus according to supplementary note 1 or 2, wherein,
 when both or either of the first memory space and the second memory space is a memory space including a plurality of cache memories, the synchronization command issuing unit of the receiving unit issues the synchronization command to all of the cache memories, and the synchronization command receiving unit of the receiving unit determines that writing to both or either of the first memory space and the second memory space is guaranteed when receiving responses indicating that writing of the data or the flag is guaranteed from all of the cache memories.

(Supplementary Note 4)

The information processing apparatus according to any of supplementary notes 1 to 3, wherein when the first memory space is a memory space including a plurality of cache memories, the synchronization command issuing unit of the receiving unit issues the synchronization command to all of the cache memories, and the synchronization command receiving unit of the receiving unit determines that writing to the first memory space is guaranteed when receiving responses indicating that writing of the data is guaranteed from all of the cache memories.

(Supplementary Note 5)

The information processing apparatus according to any of supplementary notes 1 to 4, wherein, when both or either of the first memory space and the second memory space is a memory space including a register, the synchronization command issuing unit of the receiving unit issues a read command as the synchronization command to the register, and the synchronization command receiving unit of the receiving unit determines that writing to both or either of the first memory space and the second memory space is completed when receiving a response to the read command from the register.

(Supplementary Note 6)

The information processing apparatus according to any of supplementary notes 1 to 5, wherein when the second memory space is a memory space including a plurality of registers, the synchronization command issuing unit of the receiving unit issues a read command as the synchronization command to one of the registers, and the synchronization command receiving unit of the receiving unit determines that writing to the second memory space is guaranteed when receiving a response to the read command from the one of the registers.

(Supplementary Note 7)

The information processing apparatus according to any of supplementary notes 1 to 6, wherein when the first memory space is a memory space including a plurality of cache memories, and the second memory space is a memory space including a plurality of registers, the synchronization command issuing unit of the receiving unit issues the synchronization command to all of the cache memories, and issues a read command as the synchronization command to one of the registers, and the synchronization command receiving unit of the receiving unit determines that writing to the first memory space is guaranteed when receiving responses indicating that writing of the data is guaranteed from all of the cache memories, and determines that writing to the second memory space is guaranteed when receiving a response to the read command from the one of the registers.

(Supplementary Note 8)

The information processing apparatus according to any of supplementary notes 1 to 7, wherein the synchronization control unit of the arithmetic unit instructs the receiving unit to synchronize the first memory space and the second memory space when detecting writing of the flag to the second memory space.

(Supplementary Note 9)

A processor comprising:

a receiving unit configured to receive data from outside;

a first memory space to which data is written from the receiving unit;

a second memory space to which a flag is written, the flag being used for synchronizing writing of the data;

an arithmetic unit configured to perform processing on the data, wherein the arithmetic unit includes a synchronization control unit configured to instruct the receiving unit to synchronize the first memory space and the second memory space, and receive a response indicating completion of synchronization from the receiving unit, and the receiving unit includes:

a synchronization command issuing unit configured to issue a synchronization command to each of the first memory space and the second memory space, in accordance with a synchronization instruction from the arithmetic unit; and a synchronization command receiving unit configured to, in accordance with the synchronization command, receive a response indicating that writing of the data is guaranteed from the first memory space and receive a response indicating that writing of the flag is guaranteed from the second memory space, determine that writing to the first memory space and to the second memory space is guaranteed, and respond to the arithmetic unit that synchronization is completed when writing to the first memory space and to the second memory space is guaranteed.

(Supplementary Note 9.1)

The processor according to supplementary note 9, wherein the synchronization command issuing unit of the receiving unit issues, to the first memory space and the second memory space, the synchronization commands having contents corresponding to configurations of the first memory space and the second memory space, respectively.

(Supplementary Note 9.2)

The processor according to supplementary note 9 or 9.1, wherein, when both or either of the first memory space and the second memory space is a memory space including a plurality of cache memories, the synchronization command issuing unit of the receiving unit issues the synchronization command to all of the cache memories, and the synchronization command receiving unit of the receiving unit determines that writing to both or either of the first memory space and the second memory space is guaranteed when receiving responses indicating that writing of the data or the flag is guaranteed from all of the cache memories.

(Supplementary Note 9.3)

The processor according to any of supplementary notes 9 to 9.2, wherein when the first memory space is a memory space including a plurality of cache memories, the synchronization command issuing unit of the receiving unit issues the synchronization command to all of the cache memories, and the synchronization command receiving unit of the receiving unit determines that writing to the first memory space is guaranteed when receiving responses indicating that writing of the data is guaranteed from all of the cache memories.

(Supplementary Note 9.4)

The processor according to any of supplementary notes 9 to 9.3, wherein, when both or either of the first memory space and the second memory space is a memory space including a register, the synchronization command issuing unit of the receiving unit issues a read command as the synchronization command to the register, and the synchronization command receiving unit of the receiving unit determines that writing to both or either of the first memory space and the second memory space is completed when receiving a response to the read command from the register.

(Supplementary Note 9.5)

The processor according to any of supplementary notes 9 to 9.4, wherein when the second memory space is a memory space including a plurality of registers, the synchronization command issuing unit of the receiving unit issues a read command as the synchronization command to one of the registers, and the synchronization command receiving unit of the receiving unit determines that writing to the second memory space is guaranteed when receiving a response to the read command from the one of the registers.

(Supplementary Note 9.6)

The processor according to any of supplementary notes 9 to 9.5, wherein when the first memory space is a memory space including a plurality of cache memories, and the second memory space is a memory space including a plurality of registers, the synchronization command issuing unit of the receiving unit issues the synchronization command to all of the cache memories, and issues a read command as the synchronization command to one of the registers, and the synchronization command receiving unit of the receiving unit determines that writing to the first memory space is guaranteed when receiving responses indicating that writing of the data is guaranteed from all of the cache memories, and determines that writing to the second memory space is guaranteed when receiving a response to the read command from the one of the registers.

(Supplementary Note 9.7)

The processor according to any of supplementary notes 9 to 9.6, wherein the synchronization control unit of the arithmetic unit instructs the receiving unit to synchronize the first memory space and the second memory space when detecting writing of the flag to the second memory space.

(Supplementary Note 10)

A synchronization method performed by an information processing apparatus including a receiving unit configured to receive data from outside, a first memory space to which data is written from the receiving unit, a second memory space to which a flag to be used for synchronizing writing of the data is written, and an arithmetic unit configured to perform processing on the data, the method comprising:

by the arithmetic unit, instructing the receiving unit to synchronize the first memory space and the second memory space, and receive a response indicating completion of synchronization from the receiving unit, and by the receiving unit, in accordance with a synchronization instruction from the arithmetic unit, issuing a synchronization command to each of the first memory space and the second memory space, and receiving a response indicating that writing of the data is guaranteed from the first memory space and a response indicating that writing of the flag is guaranteed from the second memory space, determining that writing to the first memory space and to the second memory space is guaranteed, and responding to the arithmetic unit that synchronization is completed when writing to the first memory space and to the second memory space is guaranteed.

(Supplementary Note 11)

The synchronization method according to supplementary note 10, further comprising by the receiving unit, issuing, to the first memory space and the second memory space, the synchronization commands having contents corresponding to configurations of the first memory space and the second memory space, respectively.

(Supplementary Note 12)

The synchronization method according to supplementary note 10 or 11, further comprising when both or either of the first memory space and the second memory space is a memory space including a plurality of cache memories, by the receiving unit, issuing the synchronization command to all of the cache memories, and determining that writing to both or either of the first memory space and the second memory space is guaranteed when receiving responses indicating that writing of the data or the flag is guaranteed from all of the cache memories.

(Supplementary Note 13)

The synchronization method according to any of supplementary notes 10 to 12, further comprising when the first memory space is a memory space including a plurality of cache memories, by the receiving unit, issuing the synchronization command to all of the cache memories, and determining that writing to the first memory space is guaranteed when receiving responses indicating that writing of the data is guaranteed from all of the cache memories.

(Supplementary Note 14)

The synchronization method according to any of supplementary notes 10 to 13, further comprising when both or either of the first memory space and the second memory space is a memory space including a register, by the receiving unit, issuing a read command as the synchronization command to the register, and determining that writing to both or either of the first memory space and the second memory space is completed when receiving a response to the read command from the register.

(Supplementary Note 15)

The synchronization method according to any of supplementary notes 10 to 14, further comprising
when the second memory space is a memory space including a plurality of registers, by the receiving unit
issuing a read command as the synchronization command to one of the registers, and
determining that writing to the second memory space is guaranteed when receiving a response to the read command from the one of the registers.

(Supplementary Note 16)

The synchronization method according to any of supplementary notes 10 to 15, further comprising
when the first memory space is a memory space including a plurality of cache memories, and the second memory space is a memory space including a plurality of registers, by the receiving unit,
issuing the synchronization command to all of the cache memories, and issues a read command as the synchronization command to one of the registers, and
determining that writing to the first memory space is guaranteed when receiving responses indicating that writing of the data is guaranteed from all of the cache memories, and determines that writing to the second memory space is guaranteed when receiving a response to the read command from the one of the registers.

(Supplementary Note 17)

The synchronization method according to any of claims 10 to 16, further comprising
by the arithmetic unit, instructing the receiving unit to synchronize the first memory space and the second memory space when detecting writing of the flag to the second memory space.

It should be noted that the program described above is stored on a storage device or a computer-readable storing medium. For example, the recording medium is a portable medium such as a flexible disk, an optical disk, a magneto-optical disk, a semiconductor memory, or the like.

While the present invention has been described with reference to the exemplary embodiments described above, the present invention is not limited to the above-described embodiments. The form and details of the present invention can be changed within the scope of the present invention in various manners that can be understood by those skilled in the art.

DESCRIPTION OF REFERENCE NUMERALS

1 PCI bus
2 processor
21 PCI receiving unit
31, 32, 33, 34 memory (MEM)
211 synchronization command issuing unit
212 synchronization command receiving unit
221, 222, 223, 224 communication register (CR)
231, 232, 233, 234 last level caches (LLC)
241, 242, 243, 244 processor core (CORE)
2311, 2321, 2331, 2341 special fence transfer unit
2312, 2322, 2332, 2342 synchronization establishment determination unit
2411, 2421, 2431, 2441 special fence control unit
100 information processing apparatus
110 receiving unit
111 synchronization command issuing unit
112 synchronization command receiving unit
120 arithmetic unit
121 synchronization control unit
130 first memory space
140 second memory space

The invention claimed is:

1. An information processing apparatus comprising:
receiving hardware to receive data from outside;
a first memory space to which the data is written;
a second memory space to which a flag is written, the flag being used for synchronizing writing of the data; and
a processor configured to perform processing on the data, wherein
the processor is configured to instruct the receiving hardware to synchronize the first memory space and the second memory space, and receive a response indicating completion of synchronization from the receiving hardware,
the receiving hardware is configured to issue a synchronization command to each of the first memory space and the second memory space, in accordance with a synchronization instruction from the processor,
the receiving hardware is configured to, in accordance with the synchronization command, receive a response indicating that writing of the data is guaranteed from the first memory space and receive a response indicating that writing of the flag is guaranteed from the second memory space, determine that writing to the first memory space and to the second memory space is guaranteed, and respond to the processor that synchronization is completed when writing to the first memory space and to the second memory space is guaranteed,
when the first memory space includes a plurality of cache memories, and the second memory space includes a plurality of registers,
the receiving hardware issues the synchronization command to all of the cache memories, and issues a read command as the synchronization command to only one of the registers, and
the receiving hardware determines that writing to the first memory space is guaranteed when receiving responses indicating that writing of the data is guaranteed from all of the cache memories, and determines that writing to the second memory space is guaranteed when receiving a response to the read command from the one of the registers.

2. The information processing apparatus according to claim 1, wherein
the receiving hardware issues, to the first memory space and the second memory space, the synchronization commands having contents corresponding to configurations of the first memory space and the second memory space, respectively.

3. The information processing apparatus according to claim 1, wherein
the processor instructs the receiving hardware to synchronize the first memory space and the second memory space when detecting writing of the flag to the second memory space.

4. A processor comprising:
receiving hardware configured to receive data from outside;
a first memory space to which the data is written;
a second memory space to which a flag is written, the flag being used for synchronizing writing of the data;

processing hardware configured to perform processing on the data, wherein the processing hardware is configured to instruct the receiving hardware to synchronize the first memory space and the second memory space, and receive a response indicating completion of synchronization from the receiving hardware, the receiving hardware is configured to issue a synchronization command to each of the first memory space and the second memory space, in accordance with a synchronization instruction from the processing hardware; and the receiving hardware is configured to, in accordance with the synchronization command, receive a response indicating that writing of the data is guaranteed from the first memory space and receive a response indicating that writing of the flag is guaranteed from the second memory space, determine that writing to the first memory space and to the second memory space is guaranteed, and respond to the processing hardware that synchronization is completed when writing to the first memory space and to the second memory space is guaranteed, wherein when the first memory space includes a plurality of cache memories, and the second memory space includes a plurality of registers, the receiving hardware the synchronization command to all of the cache memories, and issues a read command as the synchronization command to only one of the registers, and the receiving hardware determines that writing to the first memory space is guaranteed when receiving responses indicating that writing of the data is guaranteed from all of the cache memories, and determines that writing to the second memory space is guaranteed when receiving a response to the read command from the one of the registers.

5. A synchronization method performed by an information processing apparatus including receiving hardware to receive data from outside, a first memory space to which the data is written, a second memory space to which a flag to be used for synchronizing writing of the data is written, and a processor configured to perform processing on the data, the method comprising:

by the processor, instructing the receiving hardware to synchronize the first memory space and the second memory space, and receive a response indicating completion of synchronization from the receiving hardware, and by the receiving hardware, in accordance with a synchronization instruction from the processor, issuing a synchronization command to each of the first memory space and the second memory space, and receiving a response indicating that writing of the data is guaranteed from the first memory space and a response indicating that writing of the flag is guaranteed from the second memory space, determining that writing to the first memory space and to the second memory space is guaranteed, and responding to the arithmetic processor that synchronization is completed when writing to the first memory space and to the second memory space is guaranteed, wherein when the first memory space includes a plurality of cache memories, and the second memory space includes a plurality of registers, the receiving hardware issues the synchronization command to all of the cache memories, and issues a read command as the synchronization command to only one of the registers, and the receiving hardware determines that writing to the first memory space is guaranteed when receiving responses indicating that writing of the data is guaranteed from all of the cache memories, and determines that writing to the second memory space is guaranteed when receiving a response to the read command from the one of the registers.

6. The synchronization method according to claim 5, further comprising by the receiving hardware, issuing, to the first memory space and the second memory space, the synchronization commands having contents corresponding to configurations of the first memory space and the second memory space, respectively.

7. The synchronization method according to claim 5, further comprising by the processor, instructing the receiving hardware to synchronize the first memory space and the second memory space when detecting writing of the flag to the second memory space.

* * * * *